Dec. 16, 1924.
N. E. GUTHRIE
1,519,730
COMPRESSION GREASE CUP
Filed Aug. 9, 1921
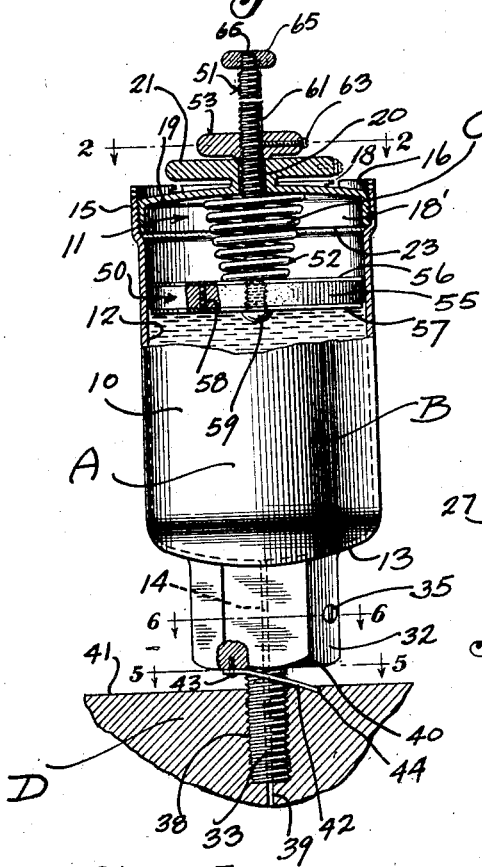
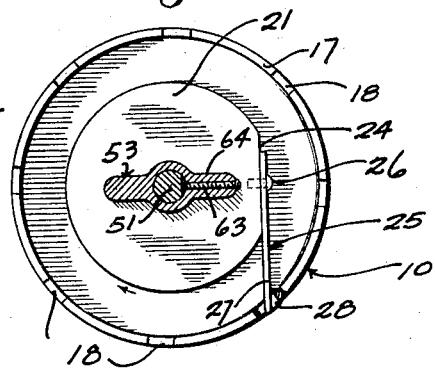
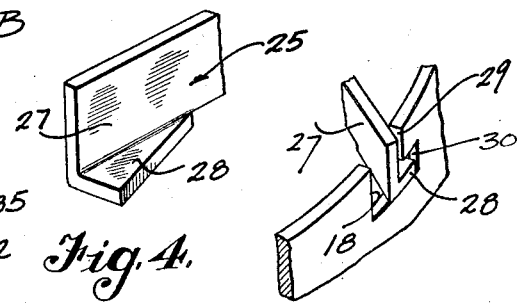
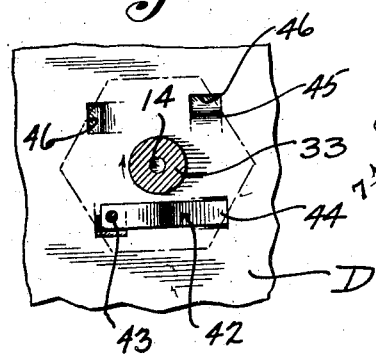
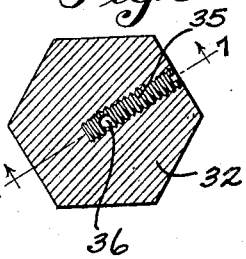
Inventor
Norman E. Guthrie
By Lancaster and Allwine
Attorneys Patented Dec. 16, 1924.

1,519,730

UNITED STATES PATENT OFFICE.

NORMAN E. GUTHRIE, OF YORBA LINDA, CALIFORNIA.

COMPRESSION GREASE CUP.

Application filed August 9, 1921. Serial No. 490,930.

*To all whom it may concern:*

Be it known that I, NORMAN E. GUTHRIE, a citizen of the United States, residing at Yorba Linda, in the county of Orange and State of California, have invented certain new and useful Improvements in Compression Grease Cups, of which the following is a specification.

This invention relates to improvements in compression grease cups.

The primary object of the invention is the provision of a grease cup for use in connection with the lubrication of bearings on vibrating or rotating machinery, in which the main parts are durably assembled in locked relation, to each other, to prevent disconnection.

A further object of the invention is the provision of a grease cup of the above described character, especially designed for use in connection with the lubrication of crank shaft bearings, cross head bearings, and the like, in high speed engines, and including positive spring compression of the grease for feed purposes.

A further object of the invention is the provision of a grease cup of the above described character, in which a container is provided, having a cap for use in connection therewith, and including novel means for positively and detachably locking the cap to the container to prevent accidental removal of the cap.

A further object of the improved grease cup is the provision of a special type of plunger apparatus, in which a stem is provided, for rigid connection to a plunger element, in a manner to prevent accidental disconnection incident to vibration.

A further object of the invention is the provision of a grease cup having an improved device thereon for locking the same to a support, to prevent accidental loosening of the grease cup from the support.

Other objects and advantages will be apparent during the course of the following detailed description.

In the accompanying drawings, forming a part of this specification, and in which similar reference characters designate corresponding parts throughout the several views.

Figure 1 is a side elevation, partly in section, of the improved grease cup, showing the parts thereof in cooperating relation, and showing the improved grease cup mounted upon a support.

Figure 2 is a plan view partly in section, taken on the line 2—2 of Figure 1.

Figure 3 is an enlarged perspective view showing the manner in which a cap is locked upon the grease cup.

Figure 4 is an enlarged perspective view of a detail used to effect locking of the cap upon the grease cup.

Figure 5 is a cross sectional view taken on the line 5—5 of Figure 1.

Figure 6 is a cross sectional view, taken on the line 6—6 of Figure 1.

Figure 7 is a fragmentary vertical section taken on the line 7—7 of Figure 6.

In the drawing, wherein for the purpose of illustration is shown the preferred embodiment of my invention, the letter A designates the improved grease cup, including a body casing B; and compression means C for grease control.

The grease cup body casing B preferably comprises the cup shaped container 10, and the detachable cap 11. The container 10 is provided interiorly with a grease pocket 12, from the bottom 13 of which a grease feed exit aperture 14 of relatively small diameter is provided. An outwardly projecting or offset annular portion 15 is provided, circumferentially about the entrance opening 16 of the container 10, and is provided at evenly spaced distances upon the extreme marginal edge 17, with bayonet slots 18 opening out upon said top margin 17.

The cap 11 is of novel formation, and has been provided with an externally threaded depending flange 18', adapted for threaded engagement interiorly of the offset 15. The roof 19 of the cap 11 is provided with a central aperture 20 therethrough, circumferentially of which is formed the overhanging disc 21, of relatively smaller diameter than the diameter of the cap 11. In attachment of the flange 18', within the offset 15, the cap 11 is positioned so that the extreme bottom marginal edge 23 abuts upon the annular shoulder provided by the offset 15. When in this position, the roof 19 lies below the bayonet slots 18 provided in the offset 15, for a purpose to be subsequently set forth. When in this position, the overhanging disc 21 extends upwardly from the top margin 17 of the container 10, as is readily seen from an observation of Figure 1 of the drawings; this overhanging disc 21 having been provided for engagement with the hand of an operator to effect attachment and detachment with the container 10.

A segmental portion of the disc 21 is removed to provide a straight side 24 thereon, for detachably receiving a flexible locking finger 25, extending tangentially from the disc 21 and secured thereto by a screw element 26. The forwardly extending portion 27 of the locking finger 25, is provided with a triangular shaped lug 28, formed at right angles thereto, and extending opposite in direction from the side of the finger 25, which is attached to the disc 21. The finger 25, can be swung vertically upon the screw 26 as a pivot. In operation, the cap 11 is attached to the offset 15 as above set forth. In order to securely lock the cap in the offset 15 to prevent longitudinal or rotational displacement therefrom, the finger 25 is swung downwardly upon its pivoting screw 26, until the locking lug 28 upon the forward end thereof is disposed within the vertical portion 29 of the bayonet slot 18. A slight loosening of the cap 11 will place the locking lug 28 of the finger 25, in the pocket recess 30 of the bayonet slot 18, and prevent further loosening of the cap 11, as well as preventing upward pivotal movement of the locking finger 25.

A polygonal shaped nut 32, is integrally provided upon the bottom 13 of the container 10, extending axially of the container 10, and having a depending screw threaded shank 33 formed thereon. The feed aperture 14 extends axially through both the polygonal head nut 32, and the screw threaded shank 33. An adjustable set screw 35 is provided radially in the polygonal nut 32, and has a lateral passageway 36 bored therethrough, whereby upon oscillation of the screw 35, the transverse bore 36 can be aligned in adjustable relation with the exit feed passageway 14, for regulating flow of grease from the pocket 12 of the grease cup A.

In using the improved grease cup A, the screw threaded shank 33 thereof is adjusted to its fullest extent into the internally screw threaded socket 38, in a support D, and in such position that the lubricant aperture 39 in the support D aligns with the feed aperture 14 of grease cup A. In this position, the bottom surface 40 of the polygonal nut 32, is spaced from the top 41 of the support D as is the case in adjusting the standard type of grease cup to a support. However, in order to prevent rotation and loosening of the grease cup A in the socket 38 of support D, a resilient locking strip 42 has been provided, for detachable engagement upon one end by a screw element 43 to the bottom surface 40 of the polygonal head 32. The strip 42 is so sprung that its free end 44 is in normal engagement with the top surface 41 of the support D. As an aid in preventing rotation of the grease cup A, indentations 45 are circumferentially provided about the socket opening 38, having abrupt shoulders 46 in each of said indentations 45, upon which the extreme end 44 of the locking strip 42 can contact to prevent unloosening or detachment of the grease cup A.

The spring compression means C includes a plunger 50; a screw threaded supporting stem 51; a compression spring 52; and an elongated adjusting nut structure 53. The plunger 50 is of special formation, including the leather washer 55, having the compression discs 56 and 57 connected upon the top and bottom surface thereof and by a screw 58, eccentrically of the plunger 50. The steel or metal discs 56 and 57 are relatively smaller in diameter than the washer 55 as in ordinary construction. All of the washer elements 55, 56 and 57 are provided with axial apertures, for threadably receiving the screw threaded stem 51; a head 59 integral with the stem 51 being provided for underlying the outer bottom surface of the lower disc 57, for supporting the plunger element 50; and in this respect differentiating from the ordinary type of plunger, in which a detachable screw is used for engaging a stem 51, to support a plunger. Thus it will be seen that the plunger 50 is securely supported by a head 59 rigid with the stem 51. The screw threaded stem 51 projects freely upwardly through the axial aperture 20 in the cap 11, and is of sufficient length to project from this aperture, even when the plunger 50 is in its lowermost position adjacent the bottom 13 of the grease cup A. A longitudinal side or strip 61 of the stem 51 is stripped of the screw threads, for a purpose to be subsequently set forth.

The plunger 50, need not necessarily be limited to the specific type above described, in which the leather washer 55 is employed. In fact, results demonstrate that the leather type of washer becomes worn in time, and results in leak of lubricant. To obviate this feature, and provide a plunger capable of withstanding vibration, the discs 56 and 57 could be formed integral upon the stem 51, with an integral web structure therebetween to provide a circumferential groove. An expansible split steel piston ring of approved type could then be slipped over the web into the circumferential groove to provide a hard, very durable and stable plunger device.

It is preferred that the plunger 50 be of the spring compression type, having the spiral tapered spring 52 circumferentially provided about the stem 51, and adapted for resting intermediate the top surface of the disc 56 and the inside surface of roof 19 on cap 11. Thus, the normal tendency of the spring 52 is to push downwardly upon the disc 56 of the plunger 50 and secure the leather washer 55 intermediate the disc elements 56 and 57, as well as to force the entire plunger 50 downwardly upon the grease within the pocket 12, for the purpose of forcing grease through the aperture 14. The regulating nut 53 is provided for threaded engagement with the stem 51, and lying exteriorly of the grease cup A for disposition upon the upper surface of the hand engaging disc 21. While this type of nut 53 is in use to a certain extent, considerable difficulty has been experienced in use with lubrication of vibrating machinery, whereby this nut has been accidentally displaced to either release or prevent release of the plunger 50. To obviate this occurrence, a set screw 63 has been provided, through a wing 64 of the elongated nut 53, and extending into the bore of said nut 53 for contact upon the stripped portion 61 of the stem 51. A retaining nut 65 has been detachably positioned upon the reduced shank 66 upon the top of the stem 51 to prevent entire detachment of the nut 53 from said stem, as well as to prevent the spring 52 exerting its full compression, when the grease cup it used without the adjusting nut 53, as is the case in some instances.

From the foregoing, it can be seen that a device has been provided, in which the entire grease cup A may be held in stationary relation to the support D to prevent relative movement therewith, and consequently accidental displacement therefrom. It has been found that in adjusting the nut 53, or in detachment of the cap 11, the screw threaded shank 33 becomes loosened in the socket 38 of the support D. Therefore, it will be seen that the locking strip 42 plays an important part in the construction of the improved grease cup A. The importance of providing the nut 53 for locking engagement upon the stem 51 is obvious to one skilled in the art to which this invention pertains; this nut 53 serving the useful function of permitting the passage of only a predetermined amount of lubricant for exit upon the bearings.

Various changes in the shape, size and arrangement of parts may be made to the form of the invention herein shown and described, without departing from the spirit of the invention, or the scope of the claims.

I claim:

1. A grease cup, comprising in combination a casing having entrance and exit apertures therein, the upper circumferential edge of said casing adjacent said entrance aperture having spaced notches therein, a cap for closing said entrance aperture, and means adjustably mounted on said cap for engaging in the notches of said casing to prevent accidental removal of the cap.

2. A grease cup, comprising in combination a container, having entrance and exit openings therein, said container being provided adjacent its entrance opening with bayonet slots, a cap for detachable engagement on the top of said container to cover the entrance opening therein, and a locking finger pivotally mounted upon said cap for adjustable engagement in the bayonet slots of said container, to lock the cap to the casing.

3. A grease cup, comprising in combination a container, having an annular offset provided adjacent the upper end thereof to form an entrance opening and having bayonet slots provided in said annular offset adjacent the upper circumferential margin of said container, said offset being screw threaded internally, a cap for screw threaded engagement with the offset, and a flexible locking finger pivotaly mounted upon said cap for engagement with the bayonet slots of said container to lock the cap thereto.

4. A grease cup, comprising in combination a container having an exit aperture therein on one end and an entrance opening adjacent the other end a cap for attachment in the entrance aperture of said grease cup, a plunger element in said grease cup, a stem for screw threaded engagement with said plunger element and having a head integral therewith to support said plunger element thereon, said plunger stem projecting upwardly through the cap, an adjustable nut mounted exteriorly of the grease cup upon said stem, and means for rigidly clamping said nut in position upon said stem.

5. A grease cup, comprising in combination a container having an exit aperture therein, a cap detachably mounted wholly within said container and below the top of said container, a hand engaging disc rigid upon said cap projecting upwardly from said container, and means supported by said cap for engaging said container to lock the cap thereto.

6. A grease cup, comprising in combination a container having a feed aperture therein, a plunger element within said container, a stem in engagement with said plunger element projecting freely through an aperture in said container, said stem having a head integral therewith for supporting said plunger thereon and provided with a longitudinal stripped portion thereon through the screw threads thereof, a nut exteriorly disposed with respect to said container and in engagement with the screw threads of said stem for adjustably maintaining the plunger for a predetermined movement in the grease cup, a set screw in said adjusting nut for clamping upon the stripped portion of said stem to lock the nut in position thereon, and compression means within said container for forcing said plunger to the predetermined movement as defined by positioning of said nut upon the stem.

NORMAN E. GUTHRIE.